United States Patent
Ferguson

(10) Patent No.: US 9,897,225 B2
(45) Date of Patent: Feb. 20, 2018

(54) MAGNETO-RHEOLOGICAL ELASTOMERIC FLUID CONTROL ARMATURE ASSEMBLY

(71) Applicant: Vernay Laboratories, Inc., Yellow Springs, OH (US)

(72) Inventor: Robert Ferguson, Newnan, GA (US)

(73) Assignee: VERNAY LABORATORIES, INC., Yellow Springs, OH (US)

( * ) Notice: Subject to any disclaimer, the term of this patent is extended or adjusted under 35 U.S.C. 154(b) by 9 days.

(21) Appl. No.: 14/659,731

(22) Filed: Mar. 17, 2015

(65) Prior Publication Data

US 2015/0184770 A1  Jul. 2, 2015

Related U.S. Application Data

(62) Division of application No. 13/408,644, filed on Feb. 29, 2012, now abandoned.

(51) Int. Cl.
*F16K 31/08* (2006.01)
*F16K 25/00* (2006.01)
(Continued)

(52) U.S. Cl.
CPC .......... *F16K 31/084* (2013.01); *F16K 15/023* (2013.01); *F16K 15/148* (2013.01);
(Continued)

(58) Field of Classification Search
CPC .... F04B 53/1025; F16K 15/144; F16K 31/08; F16K 31/084
(Continued)

(56) References Cited

U.S. PATENT DOCUMENTS 2,108,979 A   2/1938   Wile
2,267,515 A   12/1941  Wilcox et al.
(Continued)

FOREIGN PATENT DOCUMENTS

DE  102006020354 A1 * 10/2007 .......... F16K 15/063
GB       1374359      11/1974

OTHER PUBLICATIONS

PCT, International Search Report and Written Opinion, PCT/US2013/027732 (dated Apr. 25, 2013).
(Continued)

*Primary Examiner* — Seth W Mackay-Smith
(74) *Attorney, Agent, or Firm* — Thompson Hine LLP

(57) ABSTRACT

A solenoid fluid control valve having a valve body containing a solenoid coil, a fluid channel, and a seat, each coaxially disposed about a central longitudinal axis of the body, and a one-piece armature of MRE material. The armature is disposed within the fluid channel and magnetically actuable to seal against the seat, with operation of the solenoid coil actuating the armature with respect to the seat to alter the closure state of a fluid port. Also, a fluid check valve having a first valve body part defining a seat, a fluid port, and a first portion of a fluid chamber, with the seat including a permanent magnet element disposed adjacent the fluid port proximate the fluid chamber. A one-piece armature of MRE material is disposed across the fluid port and magnetically sealable against the magnet element. The armature and magnet element are configured to create a preselected magnetization offset pressure portion of a valve cracking pressure.

16 Claims, 10 Drawing Sheets

(51) Int. Cl.
*F16K 15/14* (2006.01)
*F16K 31/06* (2006.01)
*F16K 15/02* (2006.01)

(52) U.S. Cl.
CPC ...... *F16K 31/0651* (2013.01); *F16K 31/0658* (2013.01); *Y10T 137/7904* (2015.04)

(58) Field of Classification Search
USPC .................................................. 251/65, 368
See application file for complete search history.

(56) References Cited

U.S. PATENT DOCUMENTS

| | | | |
|---|---|---|---|
| 2,646,071 A * | 7/1953 | Wagner | F16K 15/023 137/528 |
| 2,830,743 A | 4/1958 | Rimsha et al. | |
| 2,949,931 A * | 8/1960 | Ruppright | F16K 15/02 137/515.7 |
| 3,164,001 A * | 1/1965 | Yoshinaga | F23Q 2/167 251/65 |
| 3,415,487 A | 12/1968 | Robarge | |
| 3,467,135 A * | 9/1969 | Ulrich | F16K 31/08 137/410 |
| 3,608,585 A | 9/1971 | Huntington | |
| 3,732,893 A | 5/1973 | Ziesche et al. | |
| 3,889,219 A | 6/1975 | Larner | |
| 4,072,919 A | 2/1978 | Clary | |
| 4,215,724 A * | 8/1980 | Logsdon | E03F 7/04 137/852 |
| 4,262,271 A | 4/1981 | Bowers et al. | |
| 4,407,448 A * | 10/1983 | Yamanaka | F16K 31/002 219/495 |
| 4,523,739 A | 6/1985 | Johansen et al. | |
| 4,528,534 A * | 7/1985 | Read | H01F 7/1607 335/262 |
| 4,621,788 A | 11/1986 | DeLew et al. | |
| 4,750,705 A * | 6/1988 | Zippe | F16K 31/003 137/248 |
| 4,874,012 A * | 10/1989 | Velie | F16K 17/34 137/521 |
| 4,932,439 A | 6/1990 | McAuliffe, Jr. | |
| 5,346,176 A | 9/1994 | Fujimoto et al. | |
| 5,374,912 A | 12/1994 | Houck, III | |
| 5,381,563 A * | 1/1995 | Isabelle | A61H 33/026 137/859 |
| 5,513,395 A * | 5/1996 | Chlebek | E03D 5/01 137/529 |
| 6,105,931 A * | 8/2000 | Frank | F16K 31/0606 251/129.15 |
| 6,199,539 B1 | 3/2001 | Pearlman et al. | |
| 6,470,905 B2 * | 10/2002 | Im | F16K 31/082 137/39 |
| 6,655,612 B2 * | 12/2003 | Oliver | F02M 51/0671 239/533.2 |
| 6,722,628 B1 | 4/2004 | Seil | |
| 6,935,364 B1 * | 8/2005 | Tarazona | F16K 17/02 137/528 |
| 7,055,798 B2 | 6/2006 | Ogawa | |
| 7,210,494 B2 * | 5/2007 | Ott | F16K 29/00 137/15.18 |
| 8,365,753 B2 * | 2/2013 | Dana | F16K 31/084 137/12 |
| 9,091,354 B2 * | 7/2015 | Schlenker | F16K 15/183 |
| 9,145,888 B2 * | 9/2015 | Hoshino | F04B 11/0091 |
| 2003/0042452 A1 | 3/2003 | Burke | |
| 2003/0145888 A1* | 8/2003 | Lin | A43B 13/203 137/223 |
| 2005/0072475 A1* | 4/2005 | Seo | F16K 15/144 137/512.15 |
| 2006/0213719 A1* | 9/2006 | Schlussler | F01N 1/163 181/237 |
| 2010/0185638 A1 | 7/2010 | Wright et al. | |
| 2011/0168271 A1 | 7/2011 | Garcia et al. | |
| 2012/0107650 A1* | 5/2012 | Kritzer | F16K 31/084 429/53 |
| 2012/0141308 A1* | 6/2012 | Saini | C08G 18/10 417/452 |

OTHER PUBLICATIONS

U.S., Non-Final Office Action; U.S. Appl. No. 13/408,644 (dated Apr. 24, 2014).
U.S., Final Office Action; U.S. Appl. No. 13/408,644 (dated Sep. 17, 2014).
U.S., Advisory Action Before the Filing of an Appeal Brief; U.S. Appl. No. 13/408,644 (dated Jan. 8, 2015).
U.S., Notice of Abandonment; U.S. Appl. No. 13/408,644 (dated Apr. 16, 2015).

* cited by examiner

MAGNETO-RHEOLOGICAL ELASTOMERIC FLUID CONTROL ARMATURE ASSEMBLY

This application is a divisional application of prior U.S. patent application Ser. No. 13/408,644, filed Feb. 29, 2012, the entirety of which is incorporated by reference.

FIELD

The present disclosure is directed to fluid control valves and, more particularly, to magnetically actuated fluid control valves and self-actuating fluid check valves.

BACKGROUND

Direct-acting, magnetically-actuated fluid control valves are used in a variety of applications within industry. Typically, such valves include a solenoid coil and a metallic armature body manufactured from a ferromagnetic alloy. The metallic armature body is capped with an elastomeric sealing member which seals against a seat within the body of the valve to control the flow of fluid through the valve. A spring may bias the metallic armature body into a normally open or normally closed position, whereupon powering the solenoid coil of the valve magnetically actuates the metallic armature body against the bias (either toward the seat to seal a fluid port or away from the seat to unseal a fluid port, respectively) to alter the closure state of the valve. The elastomeric sealing member may provide for both fluid sealing and impact absorption during operation of the valve.

Self-actuating fluid check valves are also commonly used within industry, household fixtures, and consumer products. Typically, such valves include a resilient sealing member, such as an elastomeric ball or disc, which may be biased against a seat in the valve body by gravity, by preloading via a spring, or by the intrinsic resilience of the sealing member (such as in an umbrella valve). The flow of fluid from an upstream side of the valve displaces the sealing member from the seat, allowing fluid to flow past the sealing member and to a downstream fluid port in the valve. The biasing of the sealing member, as well as any flow of fluid into the downstream port the valve (a reversed flow), drives the sealing member toward seat and, upon sealing engagement, serves to prevent fluid from flowing past the sealing member to an upstream fluid port of the valve. Fluid check valves may also desirably have a minimum "cracking pressure," defined as the minimum upstream pressure required to open the valve and start fluid flow through the valve. That cracking pressure is conventionally varied by altering the preloading displacement or spring constant of a biasing spring, by altering the preloading displacement or modulus of elasticity of the sealing member material, or by related means.

SUMMARY

The applicant has determined that such fluid control valves may be advantageously enhanced, whether through simplified construction or greater flexibility in material selection and other design constraints, by manufacturing the sealing armature from a magneto-rheological elastomer material or "MRE." Such materials comprise an elastomer, such as a natural or synthetic rubber compound, and a particulate ferromagnetic material, such as a ferrite, prepared as an essentially homogeneous suspension. The MRE material is subsequently molded, formed, or shaped into an armature body shape by various mechanical and chemical processes depending upon whether the elastomer matrix is a rubber (vulcanization), a thermoset (thermal or chemical curing), a thermoplastic (cooling below an elevated melting temperature), etc. Such materials, when formed into a magneto-rheological elastomeric armature, may simplify actuator and/or sealing armature construction, allow for substantial reductions in valve component size, and enable more compact valve body designs.

An MRE sealing armature may be incorporated into a solenoid fluid control valve to provide a one-piece, magnetically-actuable armature which effectively seals a fluid port. Even more advantageously, an MRE sealing armature may be incorporated into a self-actuating fluid check valve having a permanent magnet element in order to abolish dependencies upon valve orientation, to eliminate the need for a biasing spring, and/or to endow a particular valve design with greater flexibility in configured cracking pressure by altering the preload or apparent pliancy of a sealing armature without necessarily altering a spring characteristic or switching to a less pliant armature material. The MRE sealing armatures and disclosed valve designs consequently provide significant advantages such as simplified construction and greater flexibility in design and material selection over conventional direct-acting, magnetically-actuated or self-actuating fluid control valve designs.

In a first aspect, the disclosure pertains to a magnetically-actuated, solenoid fluid control valve. The valve has a valve body containing a solenoid coil, a fluid channel, and a seat, each coaxially disposed about a central longitudinal axis of the valve body, and a one-piece armature of MRE material. The one-piece armature is disposed within the fluid channel and magnetically actuable to bring a sealing end into sealing engagement with the seat, and the fluid channel has a first end including a first fluid port in fluid communication with the seat, whereby operation of the solenoid coil actuates the one-piece armature with respect to the seat to alter the closure state the first fluid port. It is noted that magnetic actuation may include actuation of the one-piece armature while powering the solenoid coil to create and sustain a magnetic field, as well as actuation of the one-piece armature while depowering the solenoid coil to collapse the magnetic field.

In a second aspect, the disclosure pertains to a self-actuating fluid check valve. The valve has a first valve body part defining a seat, a fluid port, and a first portion of a fluid chamber, with the seat including a permanent magnet element disposed adjacent the fluid port proximate the fluid chamber. A one-piece armature of MRE material is disposed across the fluid port and magnetically sealable against the permanent magnet element of the seat. The one-piece armature and the permanent magnet element are configured to create a preselected magnetization offset pressure portion of a valve cracking pressure.

DETAILED DESCRIPTION

Figure 1:
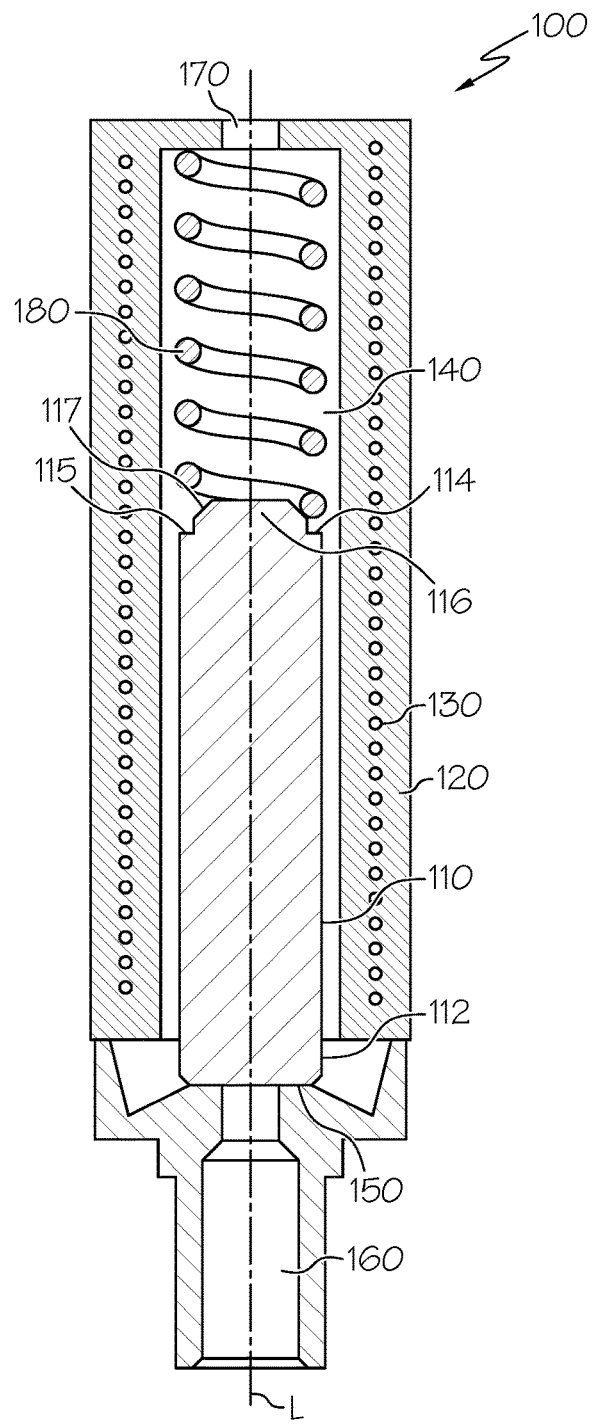
FIG. 1 is a sectional profile view of a normally closed solenoid fluid control valve in a closed position.

A first aspect of the disclosure is a magnetically-actuated, solenoid fluid control valve 100. With initial reference to FIG. 1, the solenoid fluid control valve 100 incorporates a one-piece armature 110 manufactured from a magneto-rheological elastomer or MRE. The MRE generally comprises an elastomer matrix containing a dispersed particulate ferromagnetic filler. In one exemplary implementation, the elastomer is a vulcanized natural rubber, and the ferromagnetic filler is a particulate strontium ferrite present in a range about 70% to about 84% by weight. In another exemplary implementation the elastomer is a synthetic rubber or polymer such as EPDM (ethylene-propylene-diene monomer) or SEBS (styrene-ethylene-butylene-styrene), and the ferromagnetic filler is a particulate barium ferrite present in a range about 70% to about 84% by weight. The material preferably has a Shore hardness of about 55 to about 85 on the Shore A scale. Those of skill in the art will appreciate that the Shore hardness of the material of armature 110 will tend to be greater than that of the elastomer itself due to the amount and form of the ferromagnetic filler incorporated into the elastomer matrix, and that varying combinations of particular elastomers and ferromagnetic fillers may be used to manufacture the armature 110. The one-piece armature is preferably an essentially homogeneous mixture of these materials, yet may be coated with a different polymer than that of the elastomer matrix, such as polytetrafluoroethylene, in order to provide increased chemical resistance and/or increased resistance to fouling.

The solenoid fluid control valve 100 more generally comprises a valve body 120 containing a solenoid coil 130, a fluid channel 140, and a seat 150 each coaxially disposed about a central longitudinal axis "L." A first end of the fluid channel 140 includes a first fluid port 160 in fluid communication with the seat 150, with the seat being configured for sealing engagement with a sealing end 112 of the one-piece armature 110. In operation, a force may bias the one-piece armature 110 with respect to the seat 150, with the sealing end 112 entering into sealing engagement with the seat 150 to prevent fluid flow through the first fluid port 160 or withdrawing from sealing engagement with the seat 150 to allow fluid flow through the first fluid port 160. Another portion of the fluid channel 140, such as the second end of the fluid channel, includes a second fluid port 170 to permit flow within the fluid channel 140 and through the valve 100. It will be appreciated that the second fluid port 170 may alternately be disposed in the sidewall of the fluid channel 140 or even in a non-coaxially disposed segment or branch of the fluid channel 140, rather than the axially aligned location illustrated in the figures.

Figure 2:
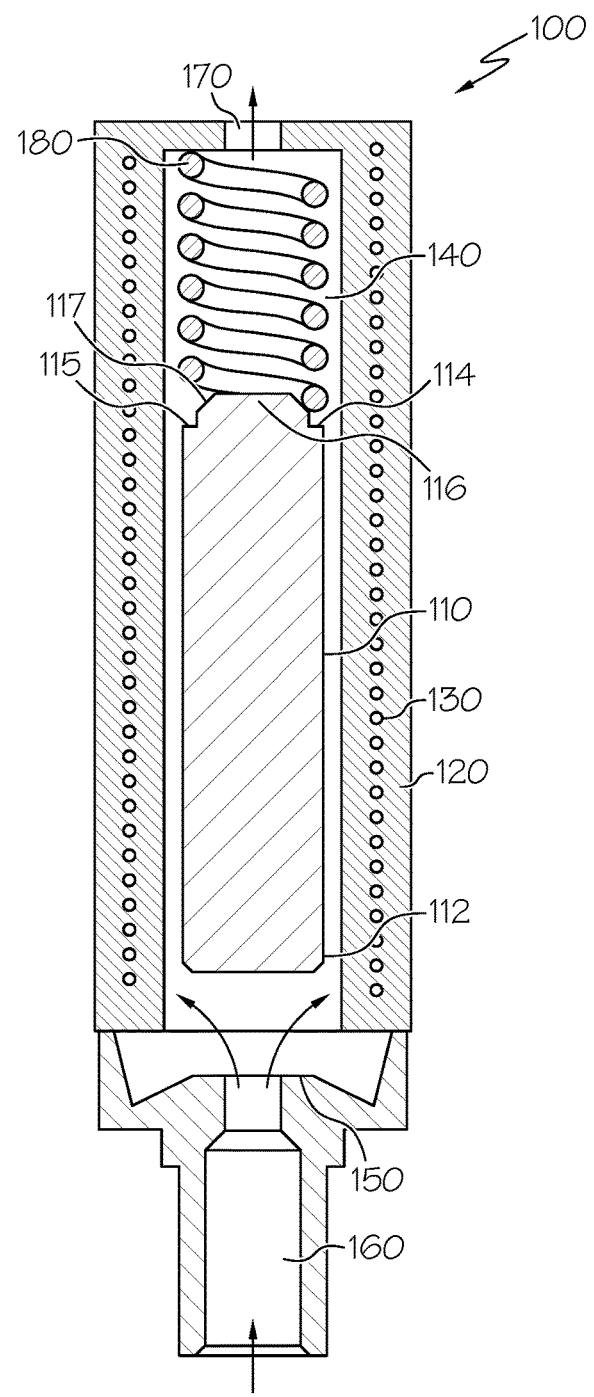
FIG. 2 is a sectional profile view of the normally closed solenoid fluid control valve of FIG. 1 in an open position.
Figure 3:
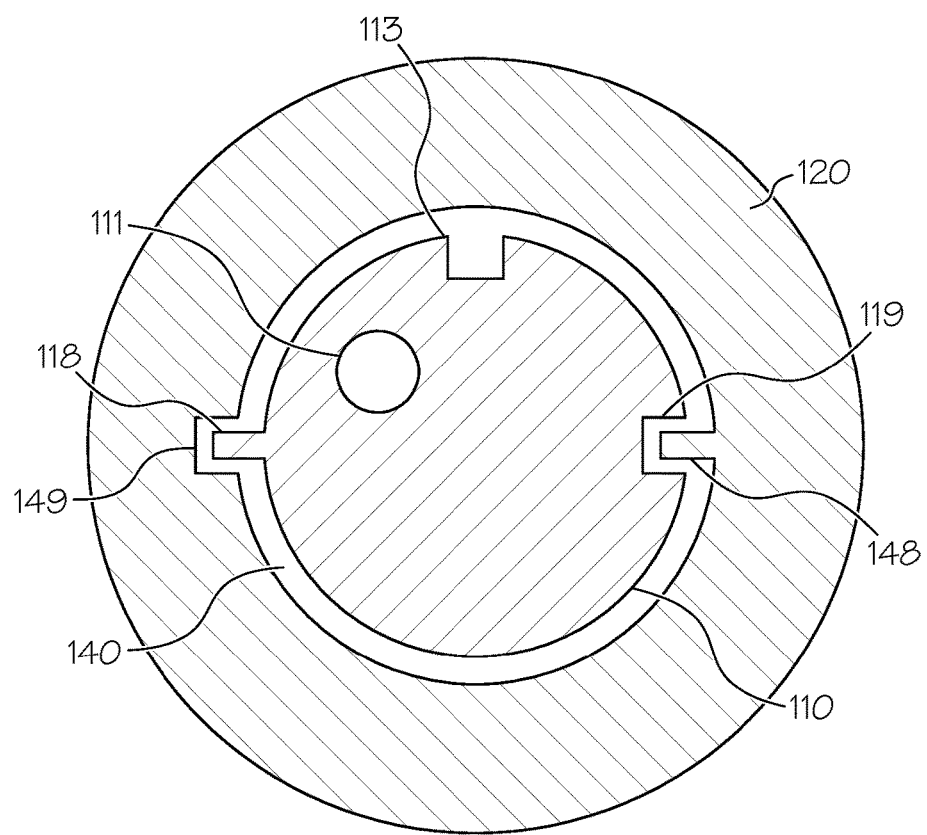
FIG. 3 is a sectional end view of a solenoid fluid control valve showing an optional guide projection 118 in the armature and a complementary guide channel 149 in the valve body, an optional guide channel 119 in the armature and a complementary guide projection 148 in the valve body, an optional internal passage in the armature, and optional surface channel in the armature.

In a first embodiment, shown in FIGS. 1 and 2, the fluid control valve 100 is a normally closed fluid control valve, and includes a spring 180 coaxially disposed about the central longitudinal axis L within the fluid channel 140 opposite the seat 150. This spring 180 may matingly engage with a profiled spring contact 114 on the end of the one-piece armature 110 opposite the sealing end 112. For example, the profiled spring contact 114 may include a peripheral land 115 surrounding a projecting nub 116, with the nub 116 preferably including a chamfered peripheral surface 117 to enhance pulling force into the solenoid coil 130. The one-piece armature 110 and fluid channel 140 are preferably generally cylindrical, but it will be appreciated that the these elements may have other cross-sectional profiles as well, including generally ellipsoidal, rectangular, or square profiles, in order to maintain the one-piece armature 110 in a preset orientation. As shown in FIG. 3, the one-piece armature 110 and fluid channel 140 may alternately or additionally include complementary guide elements such as projections 118, 148 and channels 119, 149 in order to maintain the one-piece armature 110 in a preset orientation. The one-piece armature 110 may generally have the described cross sections while also incorporating internal passages 111 or surface channels 113 for the delivery of fluid to other fluid ports, such as in some three-way solenoid fluid control valve designs. Operation of the solenoid coil 130 actuates the one-piece armature 110 with respect to the seat 150 to overcome the spring's closing bias and seal the fluid port 160 against fluid flow.

Figure 4:
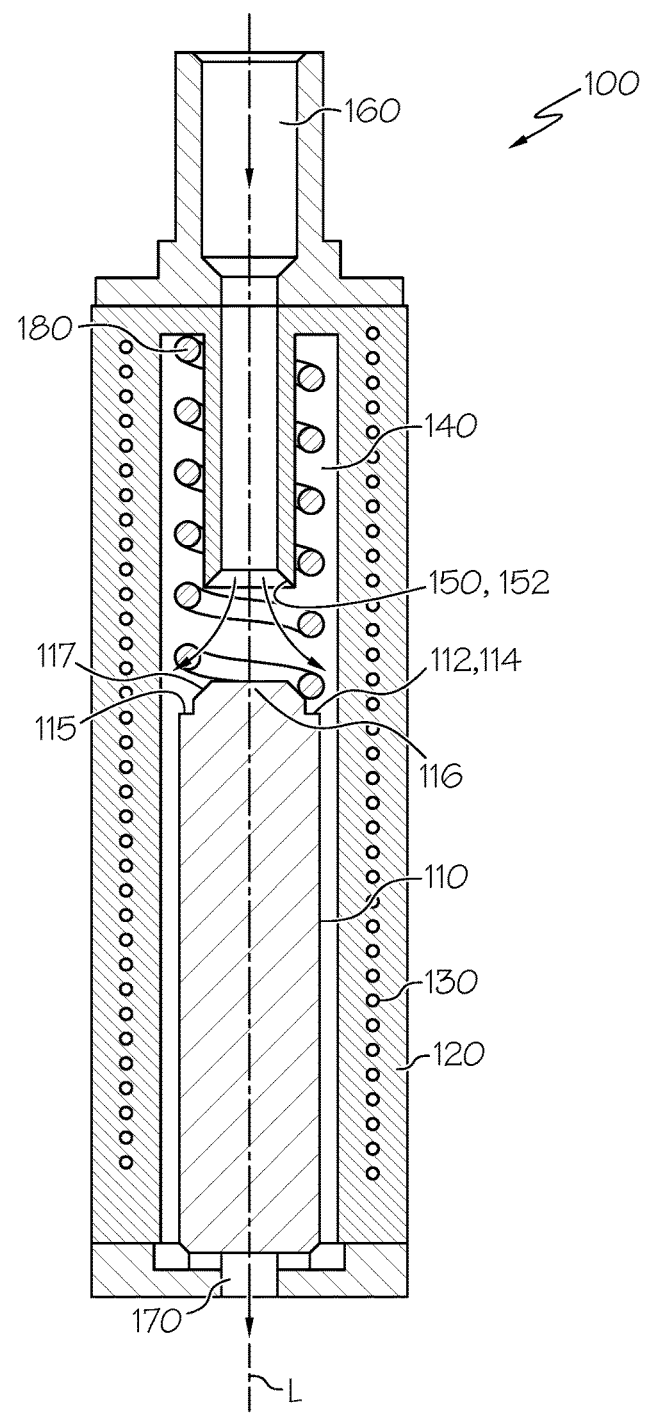
FIG. 4 is a sectional profile view of a normally open solenoid fluid control valve in an open position.
Figure 5:
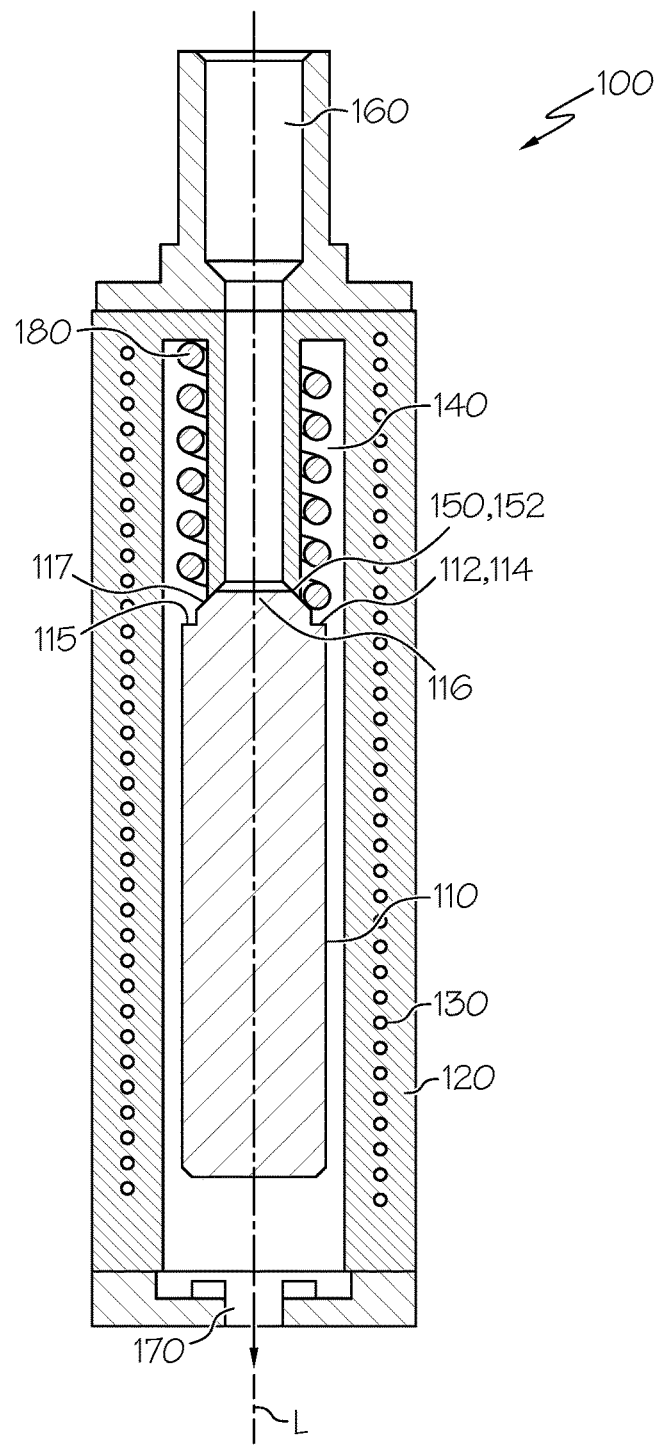
FIG. 5 is a sectional profile view of the normally open solenoid fluid control valve of FIG. 4 in a closed position.

In a second embodiment, shown in FIGS. 4 and 5, the fluid control valve 100 is a normally open fluid control valve, and includes a spring 180 coaxially disposed about the central longitudinal axis L within the fluid channel 140 and around the seat 150. This spring 180 may matingly engage with a profiled spring contact 114 on the sealing end 112. For example, the profiled spring contact may include a peripheral land 115 surrounding a projecting sealing nub 116, with the sealing nub 116 preferably including a chamfered peripheral surface 117 to enhance pulling force into the solenoid coil 130, as well as to seal against a complementary chamfered peripheral surface in a seat recess 152 formed in seat 150. As in the first embodiment, the one-piece armature 110 and fluid channel 140 are preferably generally cylindrical, but may have other cross sectional profiles as well, and may alternately or additionally include complementary guide elements such as projections 118, 148 and guide channels 119, 149. The one-piece armature 110 may again generally have the described cross sections while incorporating internal passages 111 or surface channels 113 for the delivery of fluid to other ports. Operation of the solenoid coil 130 actuates the one-piece armature 110 with respect to the seat 150 to overcome the spring's opening bias and seal the fluid port 160 to prohibit fluid flow.

Those of skill in the art will appreciate that the spring 180, particularly in a normally open fluid control valve, is an optional component that may be provided to ensure the desired bias, however in some normally open fluid control valves fluid pressure may provide sufficient bias towards an open state. Similarly, in some fluid control valves the solenoid coil 130 may be normally powered in order to hold the valve in a normally closed state, however this form of valve will consume more energy (which must be dissipated as heat) than normally closed valves incorporating a biasing spring. In yet other fluid control valves, a second solenoid coil could be disposed within the valve body to create a low-power/high-power coil pair which may be used to shuttle the one-piece armature 110 between open and closed positions, with one member of the pair ensuring the desired opening or closing bias, and the other member of the pair being operated to overcome the second solenoid coil's opening or closing bias.

A second aspect of the disclosure is a self-actuating fluid check valve 200. With initial reference to FIG. 6, the fluid check valve 200 incorporates a one-piece armature 210 manufactured from a magneto-rheological elastomer or MRE. As in the first embodiment, the MRE generally comprises an elastomer matrix containing a dispersed particulate ferromagnetic filler. In one exemplary implementation, the polymer is a vulcanized natural rubber, and the ferromagnetic filler is a particulate strontium ferrite present in a range about 70% to about 84% by weight. In another exemplary implementation the elastomer is a synthetic rubber or polymer such as a PUR (polyurethane ether or polyurethane ester) and the ferromagnetic filler is a particulate barium ferrite present in a range about 70% to about 84% by weight. The material preferably has a Shore hardness of about 55 to about 85 on the Shore A scale. The one-piece armature 210 is preferably an essentially homogeneous mixture of these materials, but may be coated with other materials, such as a mechanically compatible fluoropolymer, in order to provide increased chemical resistance. The one-piece armature 210 may be configured as a disk sealing member, an umbrella sealing member, a ball sealing member, a hinged flap sealing member, etc.

Figure 9:
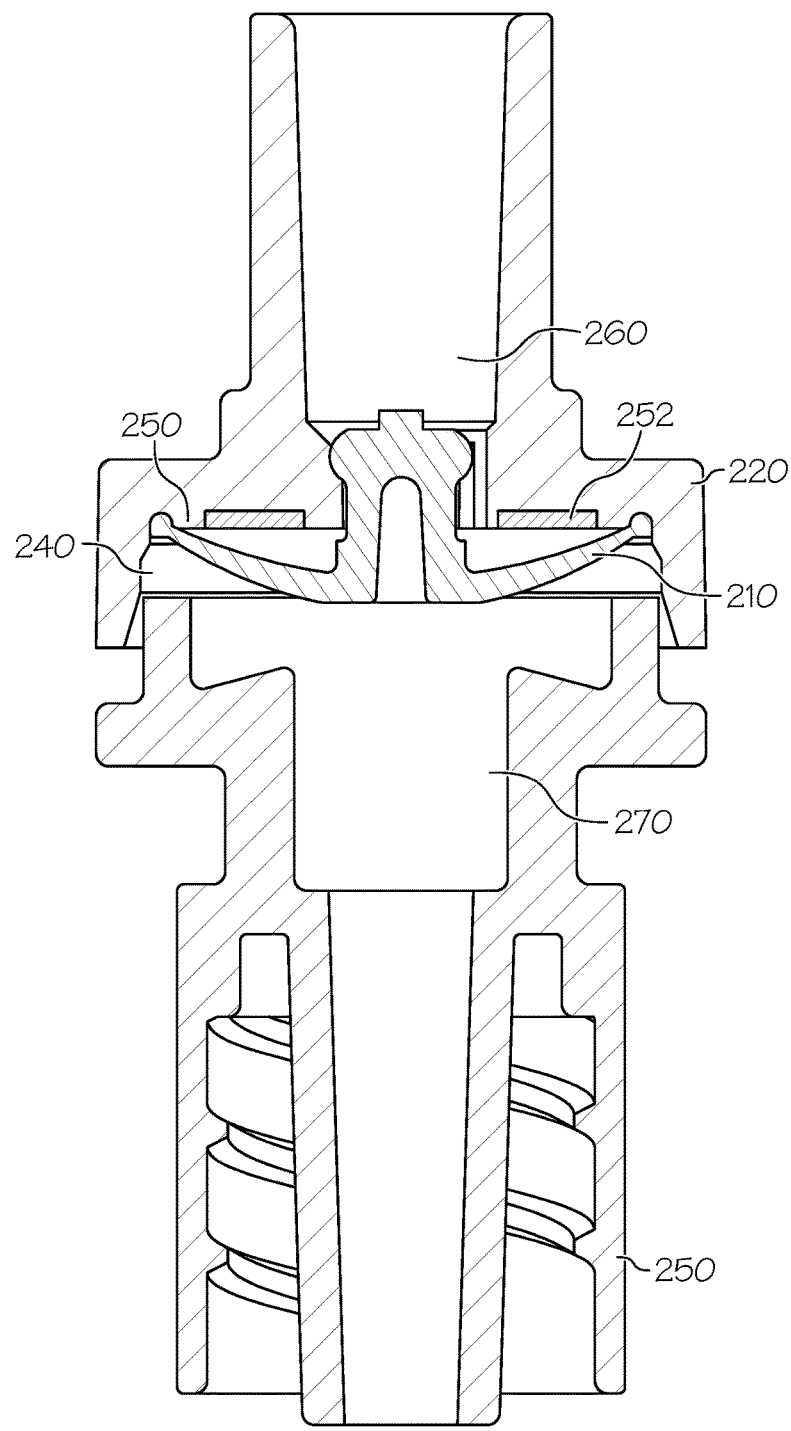
FIG. 9 is a sectional profile view of the self-actuating fluid check valve of FIG. 8, further including an exemplary second valve body part for forming an enclosed fluid chamber and downstream fluid port.

The fluid check valve 200 generally comprises a first valve body part 220 defining a seat 250, a fluid port 260, and a first portion of a fluid chamber 240. The seat 250 includes a permanent magnet element 252 disposed adjacent to, and preferably around, the fluid port 260 proximate the first portion of the fluid chamber 240. In varying embodiments, the permanent magnet element 252 may comprise an annulus of permanently magnetized material disposed coaxially about the fluid port 260. Another portion of the fluid chamber 240, e.g., another portion of the first valve body part 220, a portion of a second valve body part 230 defining a second portion of the fluid chamber 240 (as shown in FIG. 9), or a combination of the parts 220 and 230, defines a downstream fluid port 270 to permit flow through the fluid chamber 240 and the valve 200. It will be appreciated that the downstream fluid port 270 may be any opening to a downstream fluid path connected to the fluid chamber 240, although preferably the downstream fluid port 270 is configured so as to retain the one-piece armature 210 within the fluid chamber 240 of the valve 200. As discussed in further detail below, the one-piece armature 210 and the permanent magnet element 252 are configured to create a preselected magnetization offset pressure portion of a valve cracking pressure.

Figure 6A:
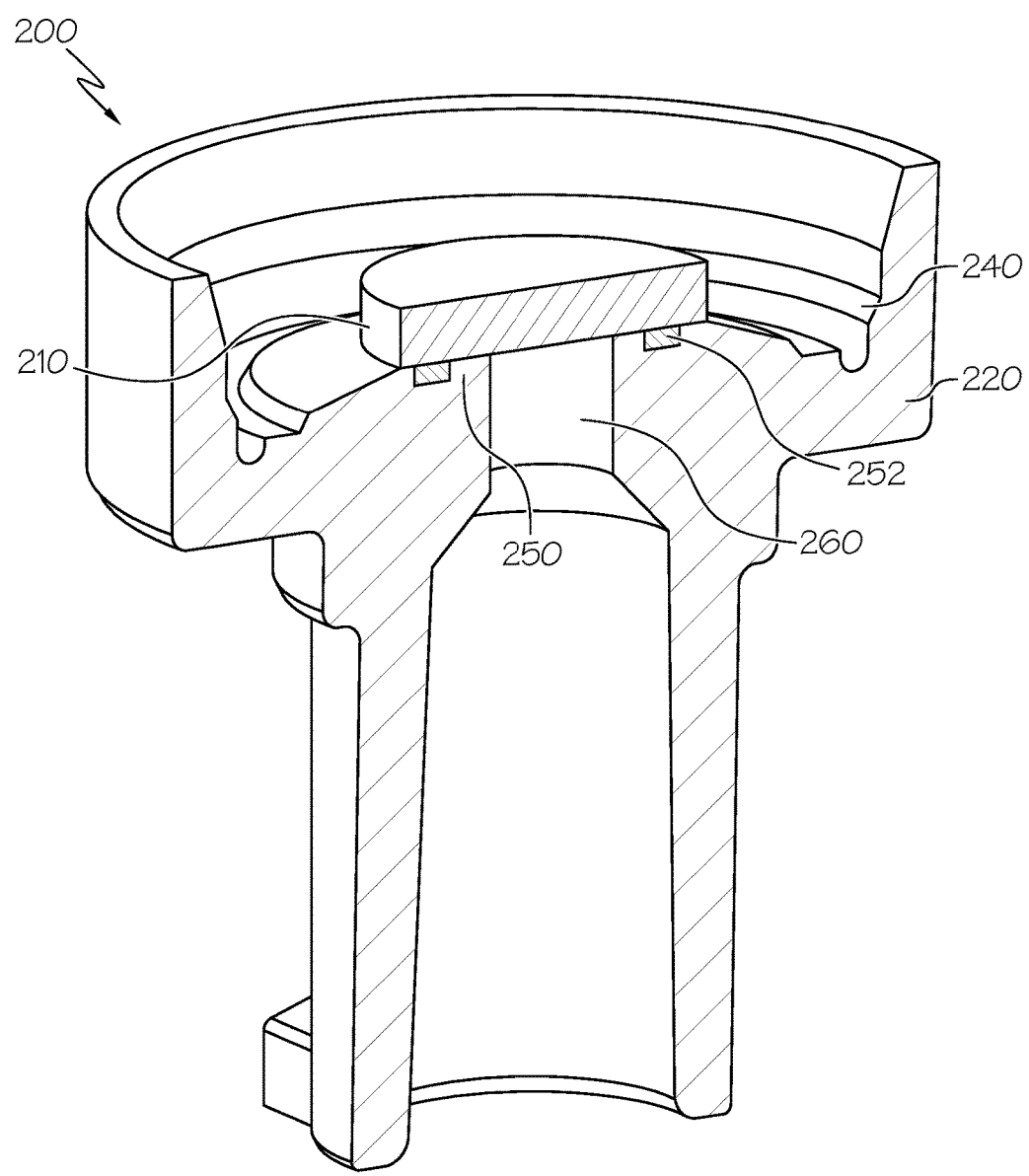
FIG. 6A is a sectional perspective view of a self-actuating fluid check valve incorporating an MRE sealing armature in a closed position.
Figure 6B:
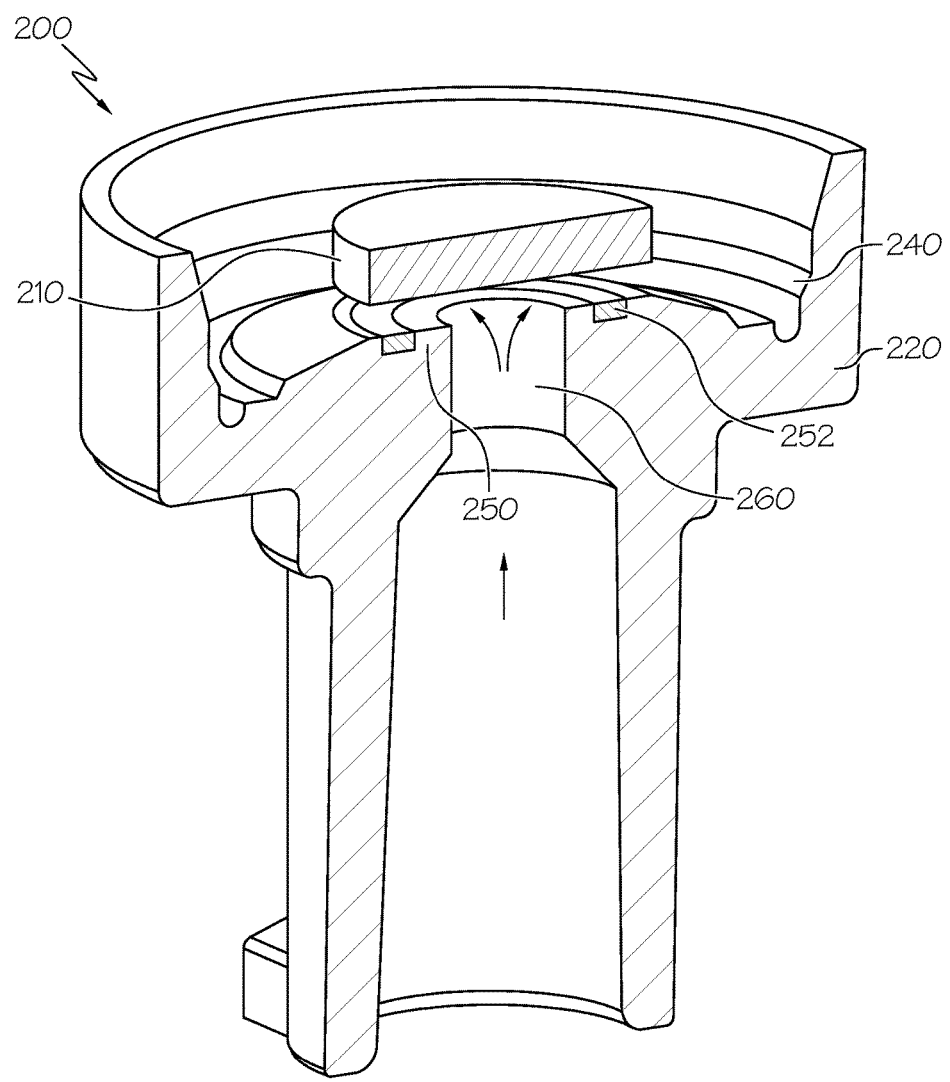
FIG. 6B is a sectional perspective view of the self-actuating fluid check valve of FIG. 6 in an open position.
Figure 7:
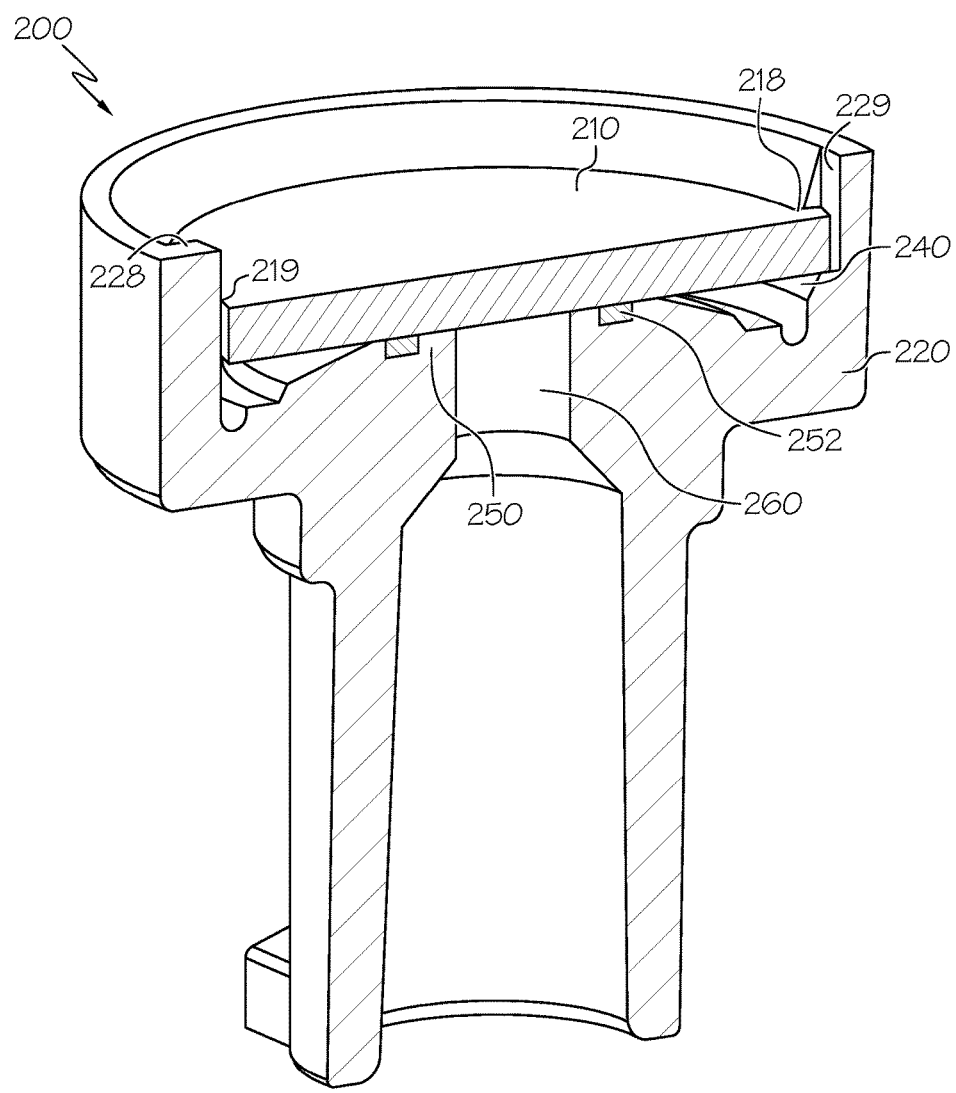
FIG. 7 is a sectional perspective view of a second self-actuating fluid check valve incorporating an MRE sealing armature in a closed position.

In a first embodiment, shown in FIGS. 6A and 6B, the fluid check valve 200 is a disk valve, with one-piece armature 210 being configured as a disk and held in proximity to the fluid port 260 between the first and second valve body parts 220, 230. The permanent magnet element 252 is an annulus of permanently magnetized material disposed coaxially about the fluid port 260, with the magnetic properties of the annulus and disk serving to center and reseat the one-piece armature 210 against the seat 250 in the event of a cessation of flow, or reverse flow, through the downstream fluid port 270. In alternate embodiments, such as the one shown in FIG. 7, guide elements 218, 219, 228, and 229, such as projections from the valve body parts 220 and/or 230 into the fluid chamber 240 and, optionally, complementary channels or apertures in the one-piece armature 210, may be used to retain the armature in position across the fluid port 260. Those of skill in the art will appreciate that the disk and/or annulus need not be truly circular as illustrated in the figures, but may be generally ellipsoidal or generally polygonal as well. Those of skill in the art will also appreciate that in other alternate embodiments, the one-piece armature 210 may be configured as a ball and held in proximity to the fluid port 260 between the first and second valve body parts 220, 230, with first valve body part 220 being formed into a funnel-like shape to further direct the one-piece armature 210 to seat within the annulus of permanent magnet element 252.

Figure 8:
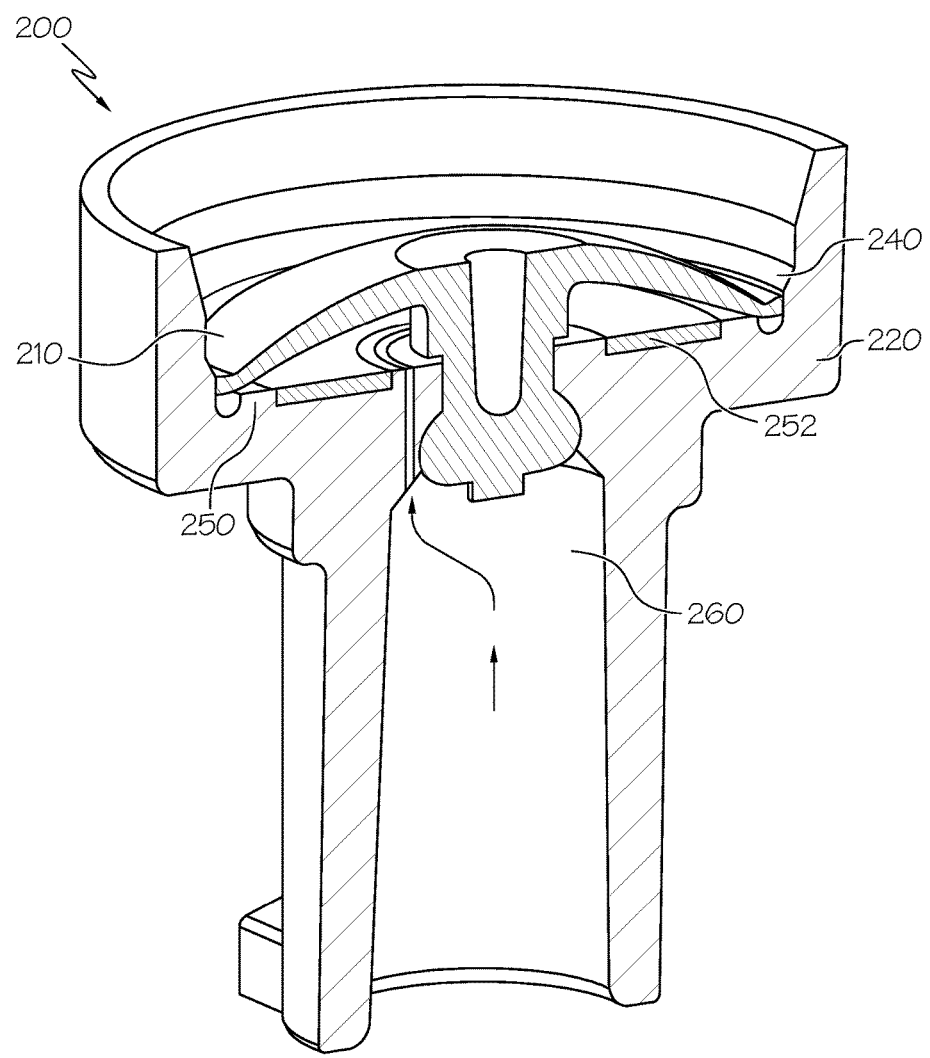
FIG. 8 is a sectional perspective view of a self-actuating fluid check valve incorporating an MRE umbrella-type sealing armature.

In a second embodiment, shown in FIG. 8, the fluid check valve 200 is an umbrella-type valve, with one-piece armature 210 being configured as an umbrella element and secured across fluid port 260 through engagement of the fluid port with the umbrella stem. The permanent magnet element 252 is an annulus of permanently magnetized material disposed coaxially about the fluid port 260, with the umbrella skirt of the one-piece armature 210 reseating against the seat 250 in proximity to the permanent magnet element 252 in the event of a cessation of flow, or reverse flow, through the downstream fluid port 270. Those of skill in the art will appreciate that the umbrella stem of an umbrella element is similar to the fixed portion of a flap sealing member having a living hinge. The one-piece armature 210 may accordingly be configured in other embodiments to have a fixed portion secured to the first valve body part 220 radially beyond the permanent magnet element 252, and a flap portion extending across the seat 250, permanent magnet element 252, and fluid port 260 so as to seal the fluid port 260 to prevent fluid flow.

In general, the attractive force between an annulus of magnetic material and a generally planer one-piece armature 210 (such as the face of a disk sealing member, the annular contact portion of an umbrella sealing member, or the flap portion of a flap sealing member) can be estimated by:

$$F = \frac{B_m^2 * A * L}{\mu} * P_f \quad (1)$$

where F is the attractive force, $B_m$ is the maximum magnetic induction of the particulate ferromagnetic filler material, $P_f$ is the weight percent of the particulate ferromagnetic filler material in the MRE, A is the area of surface contact between the one-piece armature 210 and the annulus of magnetic material (permanent magnet element 252), L is the average thickness of the one-piece armature 210 over the area of surface contact, and µ is the permeability coefficient of the medium between the one-piece armature 210 and the permanent magnet element 252, if known (with air being ~1.000000). Dividing this force by the area of surface contact yields a magnetization offset pressure, which may be treated as a valve cracking pressure, $P_{mo}$, or in cases such as umbrella valves where resiliency of the valve material further contributes to valve cracking pressure, a magnetization offset pressure portion of the valve cracking pressure.

Example 1

Several one-piece armatures 210 were manufactured in the form of disc sealing members from a sulfur-cured EPDM polymer containing varying amounts of STARBOND HM410, a strontium ferrite filler supplied by Hoosier Magnetics, Inc. of Ogdensburg, N.Y. $B_m$ and $\mu$ for the filler were 2.2 kiloGauss and 1, respectively. Six different disc exemplars were created from sheets of MRE material having a thickness (L) of either 0.075 inches or 0.040 inches and one of three levels of particulate ferromagnetic filler material: 69.6 wt. percent, 79.3 wt. percent, or 84.7 wt. percent. The area of contact (A) between an annular permanent magnet (circular, approximately 2 inch outside diameter and 9/16 inch inside diameter) and an armature disc (circular, approximately 2 inch diameter) was 2.04 inches$^2$ so as to yield the estimated cracking pressures shown in Table 1.

TABLE 1

Estimated Check Valve Cracking Pressure

| Disc Exemplar | Thickness (L) (inches) | Filler material ($P_f$) (wt. percent) | Est. Force (lbs.) | Est. Cracking Pressure (psi) |
|---|---|---|---|---|
| A | 0.075 | 69.6 | 0.515 | 0.249 |
| B | 0.075 | 79.3 | 0.587 | 0.283 |
| C | 0.075 | 84.7 | 0.627 | 0.303 |
| D | 0.040 | 69.6 | 0.275 | 0.133 |
| E | 0.040 | 79.3 | 0.313 | 0.151 |
| F* | 0.040 | 84.7 | 0.335 | 0.161 |

Disc exemplar F was not successfully created and tested. Test sheets molded at this thickness and filler content could not be demolded without tearing due to adhesion to the mold and insufficient tensile strength.

The force required to separate the disc exemplars from the permanent magnet was measured using an Instron 4411 tensile machine equipped with a 5 KiloNewton load cell. Each disc exemplar was connected in turn to the grips in the crosshead of machine using monofilament line, and the crosshead was operated at a rate of 5 inches per minute. The peak force generated during displacement of the crosshead was identified and divided by A to calculate the experimental cracking pressure of the one-piece armatures 210, reported in Table 2. The test was repeated three times upon each exemplar, and the values averaged for reporting.

TABLE 2

Experimental Check Valve Cracking Pressure (Instron 4411 testing)

| Disc Exemplar | Measured Force (lbs.) | Measured Cracking Pressure (psi) | Error in Estimate of Cracking Pressure ($\Delta$ vs. Measured, %) |
|---|---|---|---|
| A | 0.510 | 0.246 | −1 |
| B | 0.456 | 0.220 | −29 |
| C | 0.537 | 0.259 | −17 |
| D | 0.242 | 0.117 | −14 |
| E | 0.268 | 0.130 | −17 |
| F | N/A | N/A | N/A |

The average error in the estimate of cracking pressure versus the experimental results was −15%, suggesting some element of systematic error in the experimental measurement technique and/or systematic error in the model of equation (1) due to an omitted term. However, a general trend in cracking pressure as a function of armature thickness and composition will be apparent to those of ordinary skill in the art.

The various aspects and implementations described above are intended to be illustrative in nature, and are not intended to limit the scope of the invention. Any limitations to the invention will appear in the claims as allowed.

What is claimed is:

1. A self-actuating fluid check valve comprising:
   a first valve body part defining a seat, a fluid port, and a first portion of a fluid chamber, the seat including a permanent magnet element disposed adjacent the fluid port proximate the fluid chamber;
   a second valve body part defining a second portion of the fluid chamber; and
   a one-piece armature comprising an elastomer matrix containing a dispersed particulate ferromagnetic filler, the one-piece armature being disposed across the fluid port and magnetically sealable against the permanent magnet element of the seat;
   the one-piece armature and the permanent magnet element being configured to create a preselected magnetization offset pressure portion of a valve cracking pressure, wherein the valve cracking pressure includes no mechanically induced forces.

2. The self-actuating fluid check valve of claim 1, wherein the elastomer matrix is a synthetic rubber, and the ferromagnetic filler is a particulate strontium ferrite present in a range about 70% to about 84% by weight.

3. The self-actuating fluid check valve of claim 2, wherein the combined elastomer matrix and dispersed particulate filler have a Shore hardness of about 55 to about 85 on the Shore A scale.

4. The self-actuating fluid check valve of claim 1, wherein the permanent magnet element is an annulus of permanently magnetized material disposed coaxially about the fluid port.

5. The self-actuating fluid check valve of claim 1, wherein the valve is a disk valve, and the one-piece armature is configured as a disk.

6. The self-actuating fluid check valve of claim 5, wherein at least one of the first and second body portions includes guide elements projecting from the periphery of the fluid chamber into the fluid chamber, and the one-piece armature includes complementary guide elements engaging the projecting guide elements to retain the one-piece armature in position across the fluid port.

7. A self-actuating fluid check valve comprising:
   a first valve body part defining a seat, a fluid port, and a first portion of a fluid chamber, the seat including a permanent magnet element disposed adjacent the fluid port proximate the fluid chamber;
   a second valve body part defining a second portion of the fluid chamber; and
   a one-piece armature comprising an elastomer matrix containing a dispersed particulate ferromagnetic filler, the one-piece armature being disposed across the fluid port and magnetically sealable against the permanent magnet element of the seat;
   the one-piece armature and the permanent magnet element being configured to create a preselected magnetization offset pressure portion of a valve cracking pressure, wherein the valve is an umbrella valve, and the one-piece armature is configured as an umbrella element having an umbrella stem, with the one-piece armature umbrella stem being secured across the fluid port through engagement of the fluid port with the umbrella stem.

8. The self-actuating fluid check valve of claim 7, wherein the elastomer matrix is a synthetic rubber, and the ferromagnetic filler is a particulate strontium ferrite present in a range about 70% to about 84% by weight.

9. The self-actuating fluid check valve of claim 8, wherein the combined elastomer matrix and dispersed particulate filler have a Shore hardness of about 55 to about 85 on the Shore A scale.

10. The self-actuating fluid check valve of claim 7, wherein the permanent magnet element is an annulus of permanently magnetized material disposed coaxially about the fluid port.

11. A self-actuating fluid check valve comprising:
a first valve body part defining a seat, a fluid port, and a first portion of a fluid chamber, the seat including a permanent magnet element disposed adjacent the fluid port proximate the fluid chamber;
a second valve body part defining a second portion of the fluid chamber; and
a one-piece armature comprising an elastomer matrix containing a dispersed particulate ferromagnetic filler, the one-piece armature being disposed across the fluid port and magnetically sealable against the permanent magnet element of the seat;
the one-piece armature and the permanent magnet element being configured to create a preselected magnetization offset pressure portion of a valve cracking pressure, wherein the valve cracking pressure consists essentially of the preselected magnetization offset pressure.

12. The self-actuating fluid check valve of claim 11, wherein the elastomer matrix is a synthetic rubber, and the ferromagnetic filler is a particulate strontium ferrite present in a range about 70% to about 84% by weight.

13. The self-actuating fluid check valve of claim 12, wherein the combined elastomer matrix and dispersed particulate filler have a Shore hardness of about 55 to about 85 on the Shore A scale.

14. The self-actuating fluid check valve of claim 11, wherein the permanent magnet element is an annulus of permanently magnetized material disposed coaxially about the fluid port.

15. The self-actuating fluid check valve of claim 11, wherein the valve is a disk valve, and the one-piece armature is configured as a disk.

16. The self-actuating fluid check valve of claim 15, wherein at least one of the first and second body portions includes guide elements projecting from the periphery of the fluid chamber into the fluid chamber, and the one-piece armature includes complementary guide elements engaging the projecting guide elements to retain the one-piece armature in position across the fluid port.

\* \* \* \* \*